United States Patent [19]

Kuntz, Jr.

[11] 4,129,322
[45] Dec. 12, 1978

[54] SUPPORT DEVICE FOR A TRAILER

[76] Inventor: Martin Kuntz, Jr., 800 - 7th St. NW., Austin, Minn. 55912

[21] Appl. No.: 880,574

[22] Filed: Feb. 23, 1978

Related U.S. Application Data

[63] Continuation of Ser. No. 698,118, Jun. 21, 1976, abandoned.

[51] Int. Cl.$^2$ ............................................. B60S 9/12
[52] U.S. Cl. .................................. 280/766; 254/86 R
[58] Field of Search ............. 280/766, 763; 254/86 R, 254/86 H

[56] References Cited

U.S. PATENT DOCUMENTS

| | | | |
|---|---|---|---|
| 2,523,962 | 9/1950 | Mahaffey et al. | 254/86 R |
| 3,201,087 | 8/1965 | Dalton | 280/766 X |
| 3,784,160 | 1/1974 | Phillips | 280/766 X |
| 3,895,682 | 7/1975 | Graham | 254/86 R X |

FOREIGN PATENT DOCUMENTS

706288  3/1965  Canada .................................... 280/766

*Primary Examiner*—Joseph F. Peters, Jr.
*Assistant Examiner*—Norman L. Stack, Jr.
*Attorney, Agent, or Firm*—Williamson, Bains, Moore & Hansen

[57] ABSTRACT

A support device for a mobile house type trailer is mounted within a compartment adjacent the front of the trailer and includes a pair of telescoping leg structures which are extensible to engage the ground and support the trailer when it is disconnected from a prime mover, the leg structures being retractable when the trailer is connected to the prime mover. A reversible electric motor is drivingly connected to a driven shaft through a belt and pulley drive, this driven shaft being operable to extend and retract the leg structures.

1 Claim, 2 Drawing Figures

SUPPORT DEVICE FOR A TRAILER

This is a continuation of application Ser. No. 698,118, filed on June 21, 1976, now abandoned.

SUMMARY OF THE INVENTION

This invention relates to a support device for mobile house type trailers and is specifically related to a power operated extensible and retractable support device for supporting the front of the trailer when the trailer is disconnected from the prime mover.

Mobile house type trailers are provided with support devices which serve to support the front of the trailer when the latter is disconnected from a prime mover. However, these prior art support devices must be manually cranked to the extended or retracted position by an operator. Manual operation of these prior art devices is very tiring and difficult for older people.

It is therefore a general object of this invention to provide a power operated support device for mobile house type trailers including a pair of telescoping leg structures which may be power shifted to an extended or retracted position.

More specifically, it is an object of this invention to provide an extensible and retractable support device for mobile house type trailers which is power driven by a reversible electric motor through a belted pulley drive mechanism. With this new arrangement, the telescoping legs may be readily extended or retracted by an operator by merely manipulating the directional control switch and a master switch.

These and other objects and advantages of this invention will more fully appear from the following description made in connection with the accompanying drawings, wherein like reference characters refer to the same or similar parts throughout the several views.

FIGURES OF THE DRAWINGS

DESCRIPTION OF THE PREFFERED EMBODIMENT OF THE INVENTION

Figure 1:
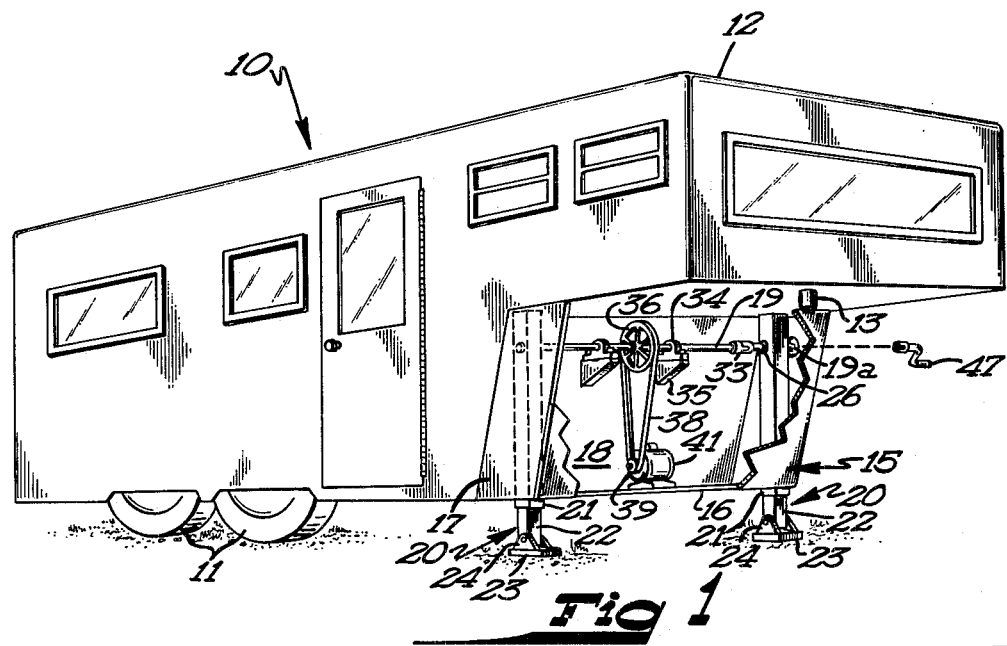
FIG. 1 is a front perspective view of a conventional mobile house trailer incorporating the novel support device with parts thereof broken away for clarity.

Referring now to the drawings and more specifically to FIG. 1, it will be seen that a conventional mobile house type trailer 10 is thereshown. The trailer 10 is provided with ground engaging wheels on opposite sides thereof and includes an over-hanging front portion 12 having a hitch mechanism 13 connected to the lower wall thereof and depending therefrom. The hitch mechanism 13 is adapted to be connected to a cooperating hitch mechanism on a prime mover such as a pick up truck, conventional automobile, or the like.

The trailer 10 is provided with a vertical front wall panel 14 which is removable and serves as a closure for a compartment 15. The compartment 15 includes a lower wall 16, side wall 17, a rear wall 18 and an upper wall.

The compartment 15 contains the trailer support structure which supports the front end portion of the trailer 10 when the trailer is disconnected from the prime mover. The trailer support device, which is oftentimes referred to as a fifth wheel mechanism, includes an elongate horizontally disposed shaft 19 which extends transversely through the compartment 15 adjacent the upper portion thereof and is journaled in the side walls 17. A pair of laterally spaced-apart, substantially parallel, telescoping leg structures 20 are positioned within the compartment 15 adjacent opposite sides thereof and project downwardly therefrom. In the embodiment shown, the leg structures 20 include a generally rectangular vertically disposed upper tubular leg member 21 which is affixed to the upper wall of the compartment 15 and which projects downwardly through the lower wall 16 thereof. Each leg structure 20 also includes a generally rectangular shaped tubular lower leg member 22 which is telescopically positioned within an upper leg member 21. Each leg structure 20 is provided with a foot member 23 having ears 24 projecting upwardly therefrom and secured to the lower end portion of the associated lower leg member 22. It will be noted that each foot member 23 presents a substantially flat lower surface and is adapted to engage the surface of the ground when the support device is in supporting relation with respect to the front end portion of the trailer 10.

In this respect, it is pointed out that the lower leg member 21 of each leg structure is adapted to be extended and retracted relative to the associated upper leg members. Means are therefore provided for extending and retracting the lower leg members of each leg structure. It will be noted that the shaft 19 extends through and is journaled in bearings 26 mounted on the upper end portions of each upper leg member 21. That portion of the shaft 19 positioned within each upper leg member actually defines a worm gear 27 which is disposed in meshing relation with a bevel gear 28.

Each lower leg member 22 has a vertical shaft 29 journaled therein for rotation relative thereto. Each vertical shaft 29 has an external threaded portion 30 which threadingly engages an internally threaded nut 31 fixed to the upper end portion of the associated lower leg member 22. The lower end portion of each vertical shaft 29 is journaled in a bearing block 32 which is affixed to the lower end portion of the associated lower leg member 29. Each bevel gear 28 is keyed to the upper end portion of one of the vertical shafts 29 for rotation therewith. It will therefore be seen that when the shaft 19 is rotated, the bevel gears 28 will be driven and will revolve the vertical shafts 29. When the vertical shafts 29 are rotated in one direction, the lower leg members 22 will be shifted downwardly or extended, and when the vertical shafts 29 are rotated in the opposite directions, the lower leg members will be retracted relative to the upper leg members.

Figure 2:
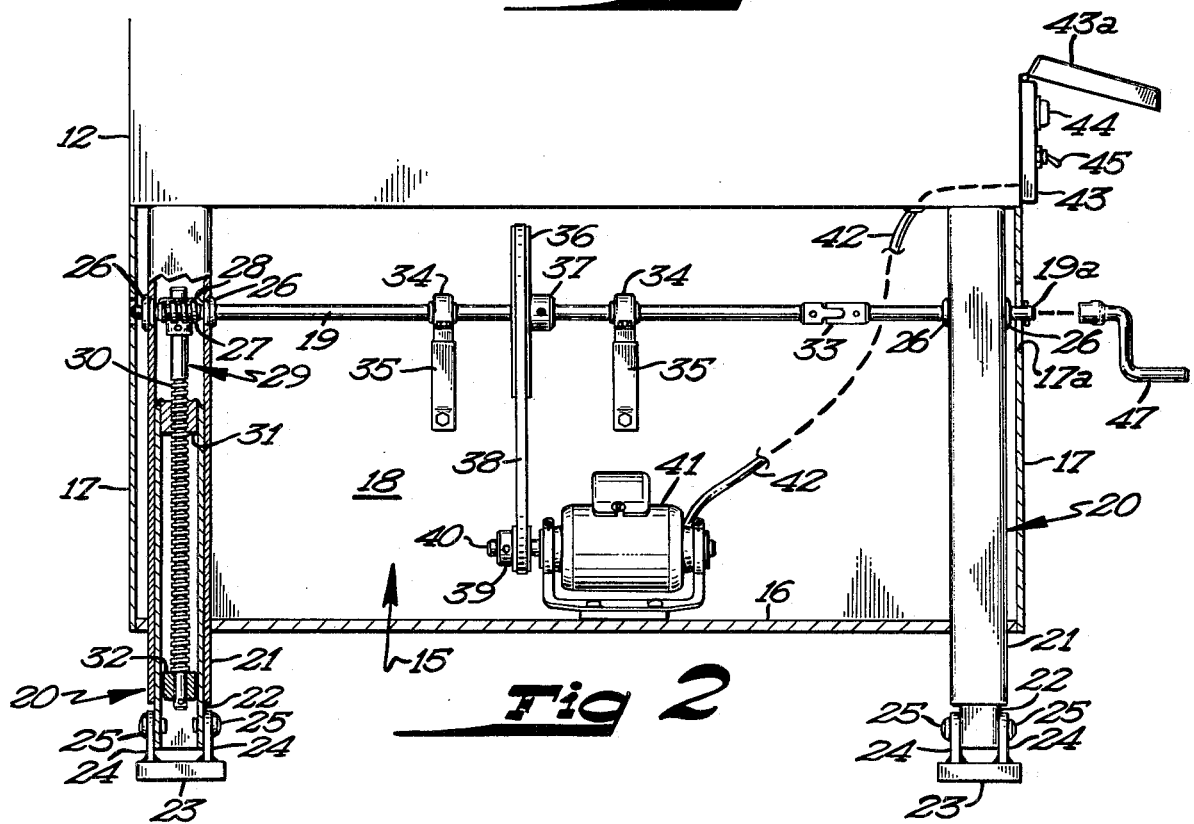
FIG. 2 is a front view partly in section and partly in elevation of the support device.

It will be noted that the driven shaft 19 is provided with a universal joint 33 adjacent one end portion thereof. It will also be noted that the driven shaft 19 is journaled in a pair of laterally spaced-apart pillow bearings 34, each bearing supported on a bracket 35 secured to the rear wall 18 of the compartment 15. A relatively large driven pulley 36 is mounted on the driven shaft 19 and is positioned between the pillow bearings 34 as best seen in FIG. 2. The driven pulley 36 is provided with a hub 37 which is keyed to the shaft 19 by a suitable set screw to permit the pulley to be adjusted longitudinally with respect to the shaft.

An endless belt 38 is trained about the pulley 36 and is also trained about a drive pulley 39 keyed to the output shaft 40 of a reversible electric motor 41. The reversible electric motor 41 is positioned within the compartment 15 and is connected to a source of electrical current by a conductor 42. A normally open on-off master switch 44 is disposed in circuit controlling relation with respect to the circuit for the electrical motor 41, the circuit also including the double throw double pole directional control switch 45.

It will therefore be seen that when the directional control switch 45 is switched to an up position, and the master switch 44 is then closed, the electric motor 41 will be driven in a direction to retract or raise the lower leg members 22. Conversely when the directional control switch 45 is shifted to the down position, and the master switch 44 is thereafter closed, the lower leg members will be extended or lowered. The directional control switch 45 and the normally open master switch 44 are located on a control panel 43a mounted on the side wall of the trailor adjacent the front portion thereof. Control panel 43 is provided with a cover 43a for normally covering the control panel.

It will also be noted that one end of the transverse driven shaft 19 is provided with an end portion 19a which projects outwardly from beyond the side wall of the compartment and is shaped for engagement by a crank handle 47. With this arrangement, the telescoping leg structures may be manually cranked between the raised and lower positions in the event the electric motor is inoperative.

When the trailer 10 is connected in towed relation to a prime mover, the lower leg members 22 will be retracted into the upper leg members so that the foot members 23 will be spaced above the surface of the ground. When the trailer is to be disconnected from the prime mover, an operator will open the control panel cover 43a and will shift the directional control switch 45 to the down position. The master switch 44 will then be depressed closing the circuit to the electric motor and the driven shaft will be rotated in a direction to extend or lower the lower leg members. The switch 44 will be released to its normally open position when the leg members have been extended downwardly and engage the ground. The trailer may then be disconnected from a prime mover and the front portion will be supported by the leg structures.

When it is desirable to retract the leg structures, the trailer will be reconnected to the prime mover and the directional control switch will be shifted to the up position. The master switch 44 will then be closed and the lower leg members will be retracted to a completely retracted position and the trailer will then be in condition for towing.

It will be seen that the present trailer support device may be readily raised and lowered by merely manipulating the directional control switch and master switch. The pulley and belt drive between the electric motor and shaft 19, and the gear drive between the shaft 19 and the rod 29 provide a highly effective positive drive between the electric motor and leg structures. The use of the pillow bearings disposed in close proximal relation to the driven pulley minimizes misalignment of the shaft.

Thus it will be seen that I have provided a novel trailer support device, which is not only of simple and inexpensive construction, but one that operates in a more efficient manner than any heretofore known comparable system.

What is claimed is:

1. A retractable and extensible type support device in combination with a mobile house type trailer having ground engaging wheels and having a compartment in the front portion thereof forwardly of the ground-engaging wheels, said compartment having an upper wall, a lower wall, and a removable front panel, a pair of laterally spaced apart vertical leg structures disposed in said compartments, each leg structure including an elongate outer affixed tubular leg member positioned within said compartment and fixedly secured to the upper wall of the latter and each having an opened lower end, the lower end portion of each outer leg member projecting through the lower wall of the compartment, each leg structure including an elongate inner tubular leg member mounted within an outer leg member and being telescopically extensible and retractable relative to the latter, said lower leg members when extended engaging the ground to support the front end portion of the trailer, a pair of internally threaded nut elements each being fixedly mounted in one of said inner leg members adjacent the upper end thereof, a pair of bearings each being positioned within one of said inner leg members adjacent the lower end thereof, a pair of vertically disposed elongate threaded rods each being journaled in bearing of one of said inner leg members and each threadedly engaging one of said nut elements, said rods when rotated in one direction causing said inner leg members to be extended, and when rotated in an opposite direction causing said inner leg members to be retracted, an elongate horizontal shaft extending transversely through and journaled in the side walls of said compartment, said shaft having a universal joint intermediate its ends, worm gears on the outer ends of said shaft, gear means on the upper ends of each of said rods meshing with said worm means, a large driven pulley keyed to said shaft intermediate the ends thereof, a reversible electric motor mounted within said compartment on the lower wall thereof and being connected to a source of electric energy, a drive pulley mounted on the output shaft of said electric motor and having a diameter smaller than said driven pulley, an endless belt trained bout said drive and driven pulleys, a pair of pillow bearings mounted within said compartment and being positioned closely adjacent said driven pulley on opposite sides thereof to revolvably support said shaft, a control panel mounted on a side wall of the trailer adjacent said compartment, a cover for said control panel, a directional control switch mounted on said control panel and being disposed in controlling relation with respect to said motor and controlling the direction of drive of the latter, a master switch mounted on said control panel and being disposed in controlling relation with said electric motor and with said directional switch and being shiftable between on and off positions, said master switch when shifted to the on position energizing said motor to thereby cause said rods and associated inner leg members to be extended or retracted.

* * * * *